(12) United States Patent
Tamura

(10) Patent No.: US 8,629,917 B2
(45) Date of Patent: Jan. 14, 2014

(54) IMAGE PROCESSING APPARATUS, METHOD, AND RECORDING MEDIUM

(75) Inventor: Nobuhiko Tamura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 143 days.

(21) Appl. No.: 13/086,289

(22) Filed: Apr. 13, 2011

(65) Prior Publication Data

US 2011/0261236 A1    Oct. 27, 2011

(30) Foreign Application Priority Data

Apr. 21, 2010  (WO) .................. PCT/JP2010/057083

(51) Int. Cl.
*H04N 5/228*    (2006.01)
*H04N 5/217*    (2011.01)

(52) U.S. Cl.
USPC ....................... 348/222.1; 348/241

(58) Field of Classification Search
None
See application file for complete search history.

(56) References Cited

U.S. PATENT DOCUMENTS

| 7,133,569 B1* | 11/2006 | Saquib | 382/262 |
| 2005/0275732 A1* | 12/2005 | Takeuchi | 348/231.99 |
| 2006/0013479 A1* | 1/2006 | Trimeche et al. | 382/167 |
| 2008/0143881 A1* | 6/2008 | Tsukioka | 348/631 |
| 2010/0079630 A1* | 4/2010 | Mishima et al. | 348/248 |
| 2010/0214446 A1* | 8/2010 | Watarai | 348/231.99 |

FOREIGN PATENT DOCUMENTS

| JP | 2002-199410 A | 7/2002 |
| JP | 2008-211679 A | 9/2008 |
| JP | 2010-087614 A | 4/2010 |

\* cited by examiner

*Primary Examiner* — Sinh Tran

*Assistant Examiner* — Jason Flohre

(74) *Attorney, Agent, or Firm* — Canon USA Inc. IP Division

(57) ABSTRACT

A blur characteristic of a captured image changes due to demosaicing at the time of blur correction of an image pickup optical system. As a result, favorable blur correction cannot be performed. Pieces of RAW data are input, correction coefficients for correcting a blur of RAW images represented by the pieces of RAW data are obtained with respect to a plurality of colors, the blur of the RAW images represented by the pieces of RAW data is corrected on the basis of the correction coefficients obtained with respect to the plurality of colors, corrected images are obtained, and a demosaic process is performed on the plurality of obtained corrected images, thereby generating output image data.

8 Claims, 8 Drawing Sheets

FIG. 4

| R | 0 | R | 0 | R |
|---|---|---|---|---|
| 0 | 0 | 0 | 0 | 0 |
| R | 0 | R | 0 | R |
| 0 | 0 | 0 | 0 | 0 |
| R | 0 | R | 0 | R |

| 0 | G | 0 | G | 0 |
|---|---|---|---|---|
| G | 0 | G | 0 | G |
| 0 | G | 0 | G | 0 |
| G | 0 | G | 0 | G |
| 0 | G | 0 | G | 0 |

| 0 | 0 | 0 | 0 | 0 |
|---|---|---|---|---|
| 0 | B | 0 | B | 0 |
| 0 | 0 | 0 | 0 | 0 |
| 0 | B | 0 | B | 0 |
| 0 | 0 | 0 | 0 | 0 |

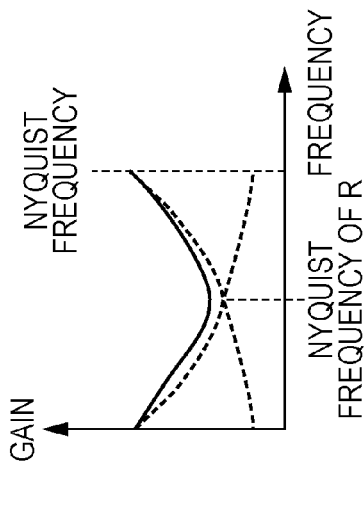
FIG. 7A
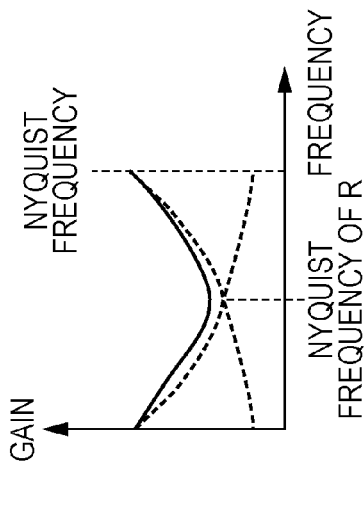
FIG. 7B
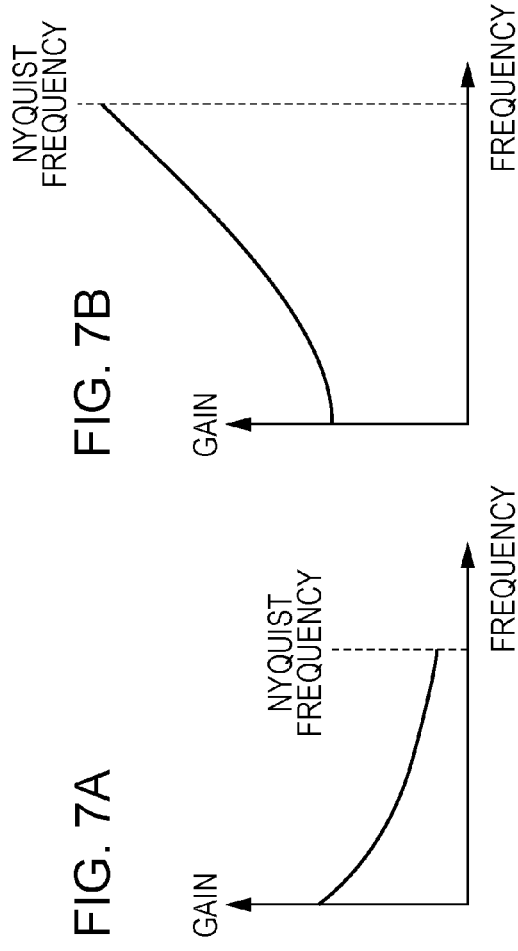
FIG. 7C
FIG. 7D
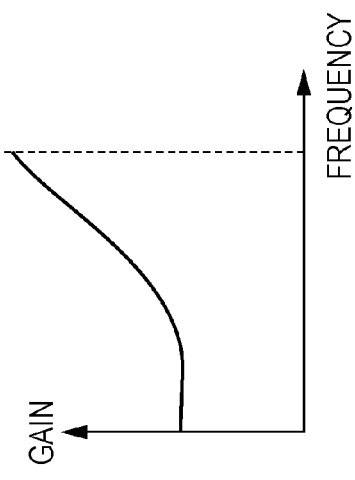
FIG. 7E
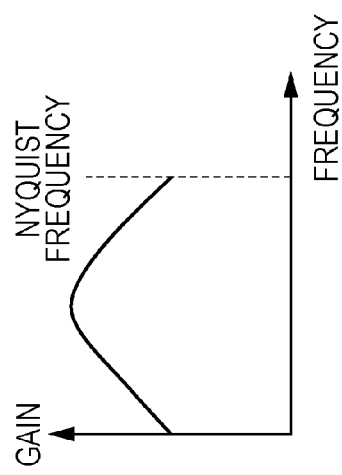

FIG. 9A

| 1/4 | 1/2 | 1/4 |
|---|---|---|
| 1/2 | 1 | 1/2 |
| 1/4 | 1/2 | 1/4 |

FIG. 9B

| 0 | 1/4 | 0 |
|---|---|---|
| 1/4 | 1 | 1/4 |
| 0 | 1/4 | 0 |

FIG. 10A

| | G1 | |
|---|---|---|
| G4 | 0 | G2 |
| | G3 | |

FIG. 10B

| | G1 | |
|---|---|---|
| G4 | (G1+G2+G3+G4)/4 | G2 |
| | G3 | |

IMAGE PROCESSING APPARATUS, METHOD, AND RECORDING MEDIUM

TECHNICAL FIELD

The present invention relates to an image recovery process for correcting a blur in a captured image.

BACKGROUND ART

In image pickup apparatuses, such as digital cameras and digital video cameras, light from a subject enters a sensor having a plurality of elements, such as a CCD or CMOS, via an image pickup optical system including a lens or the like. The light that has passed through the image pickup optical system is converted into an electric signal in the sensor. By performing processes necessary for forming an image, such as an A/D conversion process and a demosaic process, on the electric signal, a captured image can be obtained.

The quality of such a captured image is affected by the image pickup optical system. Generally, when a high-performance lens is used, a sharp image with a low degree of blurring can be obtained. In contrast, a captured image that is obtained using a low-performance lens is blurred. For example, in the case of capturing an image of a starry sky, individual stars are seen as sharp dots if the image is captured using a lens that causes a low degree of blurring. In contrast, if the image is captured using a lens that causes a high degree of blurring, individual stars are blurred and expanded and are not seen as dots.

Hereinafter, a description will be given of an image processing method for correcting a blur in a captured image that is caused by an image pickup optical system. In this method, a blur in a captured image is corrected on the basis of a point spread function (PSF). The PSF represents how a point of a subject blurs. For example, a two-dimensional distribution of light on a sensor surface in a case where an illuminant (point source) with a very small volume is captured in darkness corresponds to the PSF of the image pickup optical system.

The PSF is a point in an ideal image pickup optical system with a low degree of blurring. The PSF is not a small point and is expanded to some extent in an image pickup optical system with a high degree of blurring.

An example of a method for correcting a blur using data relating to the PSF includes a method using an inverse filter. Hereinafter, a method for forming an inverse filter will be described. A captured image obtained by using an ideal image pickup optical system that prevents the occurrence of blurring is represented by f(x, y). x and y are variables representing a two-dimensional position in a captured image, and f(x, y) represents a pixel value at the position x, y. On the other hand, a captured image obtained by using an image pickup optical system that causes blurring is represented by g(x, y). Also, the PSF of the foregoing image pickup optical system that causes blurring is represented by h(x, y). h(x, y) is determined by, for example, the characteristics of a lens, capture parameters (aperture, position of an object, zoom position, etc.), and the transmittance of color filters of a sensor. Also, h(x, y) may be determined by measuring the two-dimensional distribution of light on a sensor surface in a case where an image of a point source is captured. The following relationship is established among f(x, y), g(x, y), and h(x, y).

$$g(x,y)=h(x,y)*f(x,y) \tag{1}$$

* represents convolution (convolution integral). Correcting a blur corresponds to estimating f(x, y), which is obtained by using an ideal image pickup optical system, from a captured image g(x, y) obtained by using an image pickup optical system that causes blurring and h(x, y), which is the PSF of the image pickup optical system.

If Fourier transform is performed on Equation 1 that is expressed in a real plane to transform it into a display form in a spatial frequency plane, the form of the product of respective frequencies is obtained, as in the following equation.

$$G(u,v)=H(u,v)\cdot F(u,v) \tag{2}$$

H(u, v) is obtained by performing Fourier transform on h(x, y), which is the PSF, and is called an optical transfer function (OTF). u and v represent the coordinates on a two-dimensional frequency plane, that is, a frequency. G(u, v) is obtained by performing Fourier transform on g(x, y) (Fourier display), and F(u, v) is obtained by performing Fourier transform on f (x, y).

In order to obtain an ideal unblurred image from a blurred captured image, both sides may be divided by H as follows.

$$G(u,v)/H(u,v)=F(u,v) \tag{3}$$

By performing inverse Fourier transform on F(u, v) to recover a display form in the real plane, an ideal unblurred image f(x, y) can be obtained as a recovery image.

Here, assume that inverse Fourier transform is performed on the reciprocal of H in Equation 3 ($H^{-1}$) to obtain R. Then, convolution with respect to an image in the real plane is performed as in the following equation, so that an unblurred image can be obtained similarly.

$$g(x,y)*R(x,y)=f(x,y) \tag{4}$$

R(x, y) is called an inverse filter. Actually, a frequency (u, v) that causes H(u, v) to be 0 may exist. In the frequency that causes H(u, v) to be 0, division with zero occurs in Equation 3, and calculation is impossible to perform.

Normally, the value of OTF decreases as the frequency increases, and thus the reciprocal thereof, that is, the value of the inverse filter R(x, y), increases as the frequency is increases. Thus, if a convolution process is performed on a blurred captured image using the inverse filter, a high-frequency component of the captured image is emphasized. An actual captured image includes noise, and the noise typically has a high frequency, and thus the inverse filter may emphasize the noise.

In order to overcome the problem of not being able to perform calculation due to the occurrence of the above-described division with zero and not to excessively emphasize high-frequency noise, a Wiener filter, obtained by transforming the equation of the inverse filter R(x, y), has been suggested. Hereinafter, filters that are used for correcting a blur, such as the inverse filter and Wiener filter, will be referred to as image recovery filters.

In many image pickup apparatuses, such as digital cameras and digital video cameras, color filters of a plurality of specific colors are arranged in front of a sensor having a plurality of elements, such as a CCD and a CMOS, thereby obtaining color information. This method is referred to as a single-chip method. An example of a typical color filter array used for a single-chip digital camera or a single-chip digital video camera includes a Bayer array. In the case of a single-chip image pickup apparatus, a signal of another color cannot be obtained from an element corresponding to a color filter of a specific color. Thus, a signal of another color is obtained through interpolation using signals from neighboring elements. This interpolation process is referred to as a demosaic process (demosaicing process). Hereinafter, an image on which a demosaic process has not been performed is referred to as RAW data.

CITATION LIST

Patent Literature

PTL 1 Japanese Patent Laid-Open No. 2002-199410

An OTF varies in accordance with a capture state, such as an aperture and a zoom position. Accordingly, it is necessary to change an image recovery filter used for an image recovery process in accordance with a capture state. Various types of image processing, such as a gamma process and a color conversion process, are performed on image data obtained by an image pickup apparatus in order to increase the image quality. However, the effect of the image recovery process may decrease depending on the order in which the image recovery process and other processes are performed.

For example, if a color conversion process is performed before an image recovery process, a blur characteristic of an input image substantially changes. In particular, if a color conversion process is performed on an image that has been captured using an image pickup optical system causing blurring in an R channel, image mixture among channels occurs, so that images of G and B channels, which are channels other than the R channel, are blurred. As a result, if an image recovery process is performed on the basis of the amount of blur that is estimated from the optical characteristics with respect to the G and B channels is performed, sufficient recovery is not realized.

Normally, the image pickup optical system has a tendency in which a response characteristic in high frequencies is low. In other words, the degree of blurring increases as the pattern of a subject becomes finer. However, after demosaicing, a response characteristic of a high-frequency component included in a captured image may become high. This phenomenon is referred to as the moiré phenomenon. That is, after demosaicing, the blur characteristic of the image pickup optical system substantially changes.

If blur correction is performed on a demosaiced image using the blur characteristic of the image pickup optical system without taking such a phenomenon into consideration, a high-frequency component in which a response characteristic is already high in the demosaiced image is further emphasized. As a result, a wave-like pattern appears around edges in a blur-corrected image (artifacts such as ringing).

According to PTL 1, an effective image recovery process can be performed by performing the image recovery process before a color conversion process. However, the image recovery process (image degradation correction process) according to PTL 1 is performed on a demosaiced image.

As described above, a problem to be solved by the present invention is that favorable blur correction cannot be performed as a result of change in the blur characteristic of a captured image due to demosaicing at the time of blur correction of an image pickup optical system.

SUMMARY OF INVENTION

In order to solve the above-described problem, an image processing apparatus according to the present invention includes: input means for inputting pieces of RAW data corresponding to a plurality of colors, the pieces of RAW data being obtained on the basis of data that is obtained by sampling light that enters an image pickup apparatus including color filters of the plurality of colors and a sensor, the sampling being performed in the sensor via the color filters; obtaining means for obtaining correction coefficients for correcting a blur of RAW images represented by the pieces of RAW data with respect to the plurality of colors; correcting means for correcting the blur of the RAW images represented by the pieces of RAW data on the basis of the correction coefficients obtained by the obtaining means with respect to the plurality of colors, thereby obtaining a plurality of corrected images; and demosaicing means for performing a demosaic process on the plurality of corrected images obtained by the correcting means, thereby generating output image data.

Further features of the present invention will become apparent from the following description of exemplary embodiments with reference to the attached drawings.

BRIEF DESCRIPTION OF DRAWINGS

FIG. 4 is a diagram illustrating an example of division into color planes and zero insertion according to Embodiment 1.

FIGS. 7A to 7E are diagrams illustrating frequency characteristics according to Embodiment 1.

FIGS. 9A and 9B illustrate an example of filters used for demosaicing according to Embodiment 1.

FIGS. 10A and 10B are diagrams illustrating demosaicing according to Embodiment 1.

DESCRIPTION OF EMBODIMENTS

Embodiment 1

Hereinafter, a description will be given of an image pickup apparatus that corrects a blur in a captured image caused by an image pickup optical system according to Embodiment 1.

Figure 1:
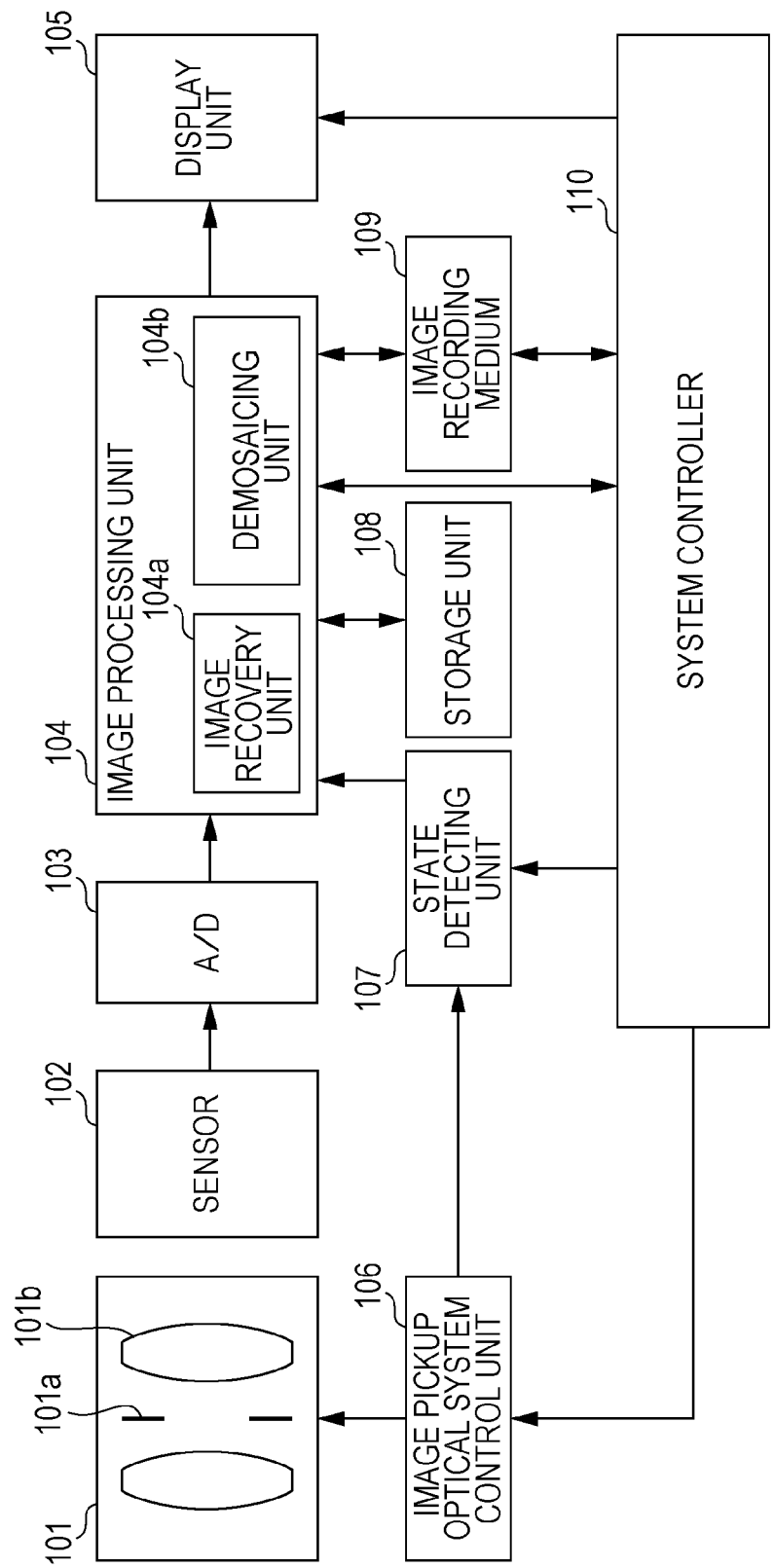
FIG. 1 is a configuration diagram of an image pickup apparatus according to Embodiment 1.
Figure 3:
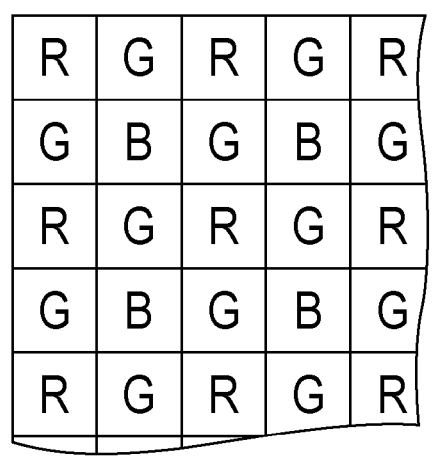
FIG. 3 illustrates an example of a color filter array of a sensor according to Embodiment 1.

FIG. 1 illustrates a basic configuration of an image pickup apparatus according to this embodiment. Light that enters the image pickup apparatus from a subject (not illustrated) passes through an image pickup optical system 101, whereby an image is formed by a sensor 102. The image formed by the sensor 102 from the light is transformed into an electric signal, which is converted into a digital signal by an A/D converter 103. This digital signal is input as RAW data into an image processing unit 104. The sensor 102 is constituted by a photoelectric conversion device that converts an optical signal corresponding to an image formed on a light receiving surface into an electric signal in units of pixels corresponding to positions. Also, the sensor 102 has a function of performing color separation using RGB filters that are arranged in a checkered pattern illustrated in FIG. 3 on the pixels on the light receiving surface of the sensor 102. The method for arranging the RGB filters and color separation illustrated in FIG. 3 are only an example, and it is needless to say that the present invention can also be applied to filters for performing color separation of CMY or the like.

The image processing unit 104 includes an image recovery unit 104a that performs blur correction on RAW data and a demosaicing unit 104b that performs demosaicing on RAW data on which blur correction has been performed.

In a blur correction process performed on RAW data, capture state information (the state of a zoom position and the state of an aperture) of the image pickup apparatus at the time of capture (when the sensor 102 samples incident light) is obtained from a state detecting unit 107.

The state detecting unit 107 may obtain the capture state information from a system controller 110 or an image pickup optical system control unit 106.

Subsequently, a correction coefficient corresponding to the capture state information is obtained from a storage unit 108, and a blur correction process is performed on a RAW image that is represented by the RAW data input to the image processing unit 104.

The storage unit 108 stores correction coefficients for image recovery filters corresponding to individual pieces of capture state information. Note that the correction coefficients corresponding to individual capture states stored in the storage unit 108 are determined on the basis of the optical characteristics of the image pickup optical system of the image pickup apparatus. Alternatively, image recovery filters may be modeled and the model parameters thereof may be stored as coefficients in order to reduce the amount of data stored in the storage unit 108. In this case, image recovery filters are appropriately generated on the basis of the coefficients of the model parameters at the time of the image recovery process described below.

The demosaicing unit 104b performs a demosaic process on the RAW data representing a RAW image on which blur correction has been performed.

The details of a method for forming the foregoing image recovery filter and the process performed by the image processing unit 104 will be described below. Corrected image data in which blur caused by the image pickup optical system 101 has been corrected by the image processing unit 104 is stored in an image recording medium 109 or is displayed on a display unit 105.

Processing Flow of Image Processing Unit 104

Figure 2:
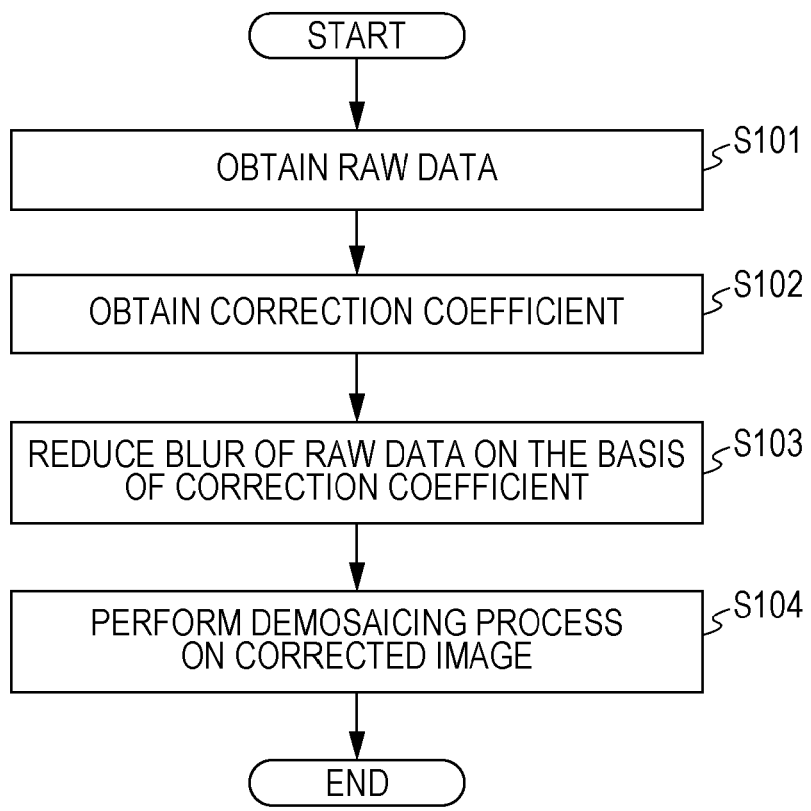
FIG. 2 is a flowchart of a process according to Embodiment 1.

FIG. 2 illustrates a processing flow regarding the image processing unit 104.

In step S101, RAW data that has been converted into a digital signal by the A/D converter 103 is obtained. The RAW data is desirably linear with respect to luminance so that the characteristics of the image pickup optical system 101 are faithfully reflected. However, RAW data that has a nonlinear value with respect to luminance may be obtained, for example, in a case where the sensor 102 or the A/D converter 103 has a nonlinear characteristic. In that case, it is desirable that the nonlinear characteristic of hardware is canceled and a process for causing the RAW data to be linear with respect to luminance is performed in step S101 together with the acquisition of data. Also, some nonlinear process may be performed without significantly changing image characteristics, such as compensation for lacking pixels.

In step S102, a coefficient of an image recovery filter (or a coefficient of a model parameter) corresponding to capture state information is obtained from the storage unit 108. The coefficient of the image recovery filter varies depending on each color of RGB. This is because individual color planes of RGB have different blur characteristics. This will be described below.

In step S103, a process of correcting a blur of the image pickup optical system is performed on the RAW data of the individual color planes of RGB using the image recovery filter. The details of the blur correction process will be described below.

In step S104, a demosaic process is performed on the RAW data on which blur correction has been performed. The details of the demosaic process will be described below.

Details of Blur Correction Process

Figure 5:
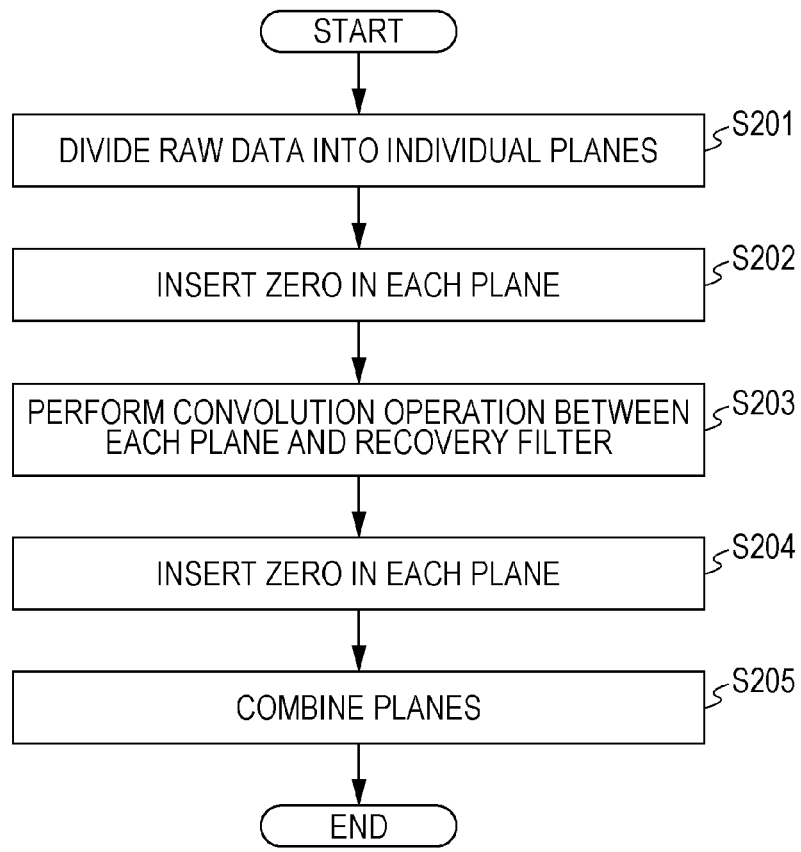
FIG. 5 is a flowchart of a blur correction process according to Embodiment 1.

The details of the blur correction process will be described with reference to the flowchart in FIG. 5.

In step S201, input RAW data is divided into separate pieces of RAW data corresponding to respective color filters (separate color planes corresponding to respective color filters) in accordance with the color filter array illustrated in FIG. 4. In the case of the single-chip method, there are pixels that do not have a value in the individual color planes. For example, in an R-plane image, R values are unknown at the pixel positions corresponding to G and B. Then, in step S202, zero is assigned to the pixels that do not have a value, as illustrated in FIG. 4.

In step S203, image recovery filters are applied to the individual color planes, thereby obtaining a corrected image. Specifically, a convolution operation is performed between the pieces of RAW data of the individual color planes to which zeros have been inserted and the image recovery filters of the individual color planes. Note that the image recovery filters for the individual color planes are different from each other, as described below.

In step S204, zero insertion is performed on the pieces of RAW data of the individual color planes after convolution, as in step S202. The pixels to which zero was inserted in step S202 may have a value different from zero after convolution, and thus zero insertion is performed again in this step.

In step S205, the pieces of RAW data of the individual color planes to which zero was input in step S204 are combined into output image data of a single plane. The image data obtained by combining the color planes in step S205 is in the form of RAW data illustrated in FIG. 3 on which demosaicing has not been performed.

Method for Forming Image Recovery Filter

A method for forming an image recovery filter used in the image recovery unit 104a will be described. With a Bayer array used as an example for description, a method for forming an image recovery filter for an R plane will be described. In both the R plane and B plane, sampling is performed on every other pixel in vertical and horizontal directions, and thus a similar discussion is also applied to the B plane. An image $g_R$ of the R plane obtained through the division into color planes in step S201 is expressed by the following equation.

$$g_R = m_R \times (h_R * f_R) \quad (5)$$

Here, $f_R$ denotes an R component of a subject image f, $h_R$ denotes the PSF corresponding to the R plane, and $m_R$ denotes a mask function (the function that is 1 at the position of the R filter and that is 0 at the position of the G and B filters).

An image $g_R'$ to which the image recovery filter for the R plane was applied in step S203 is expressed by the following equation.

$$g_R' = R_R * (m_R \times (h_R * f_R)) \quad (6)$$

Here, $R_R$ denotes the image recovery filter for the R plane. An image $G_R''$ after the mask process in step S204 has been performed is expressed by the following equation.

$$G_R'' = m_R \times [R_R * \{m_R \times (h_R * f_R)\}] \quad (7)$$

If the image $G_R''$ matches an image $m_R \times f_R$ that is obtained by masking the subject image f with a mask function $m_R$, that means a blur (image degradation) caused by the image pickup optical system 101 has been recovered. Thus, the image recovery filter $R_R$ for the R plane is mathematically calculated so that the difference between $g_R''$ and $m_R \times f_R$ is minimized. Similarly, regarding the B plane and G plane, image recovery filters $R_B$ and $R_G$ for the B plane and G plane can be obtained. A method for forming an image recovery filter will be described with reference to FIGS. 7A to 7E.

FIG. 7A illustrates the OTF of the image pickup optical system in a case where a color filter array is not taken into consideration. This may be referred to as, for easy understanding, the frequency characteristic of the image pickup optical system in a case where all the color filters are removed. Since sampling is performed in the sensor, there is no frequency over the Nyquist frequency.

In an inverse filter, a recovery filter illustrated in FIG. 7B is formed using the reciprocal of the OTF in FIG. 7A. In general, the OTF of the image pickup optical system decreases as the frequency increases, and thus an emphasis effect of the recovery filter becomes higher as the frequency increases. In the color filter array, sampling is performed on every other pixel in R, for example. Accordingly, the OTF of the image pickup optical system after the sampling forms a folded shape as illustrated in FIG. 7C regarding the Nyquist frequency of R. The frequency characteristic of the recovery filter corresponds to the reciprocal of the OTF in FIG. 7C, and thus has a peak at the Nyquist of R, as illustrated in FIG. 7D.

Now, assume a case where the recovery filter in FIG. 7B is applied to the OTF in FIG. 7C, which is an actual blur characteristic, without taking sampling with a color filter array into consideration. In this case, an image that is obtained is an image in which a high-frequency component is excessively emphasized as illustrated in FIG. 7E. That is, in the case of performing blur correction before demosaicing, it is necessary to use recovery filters that are formed in view of the Nyquist frequencies of individual colors lead from the color filter array.

Figure 8A:
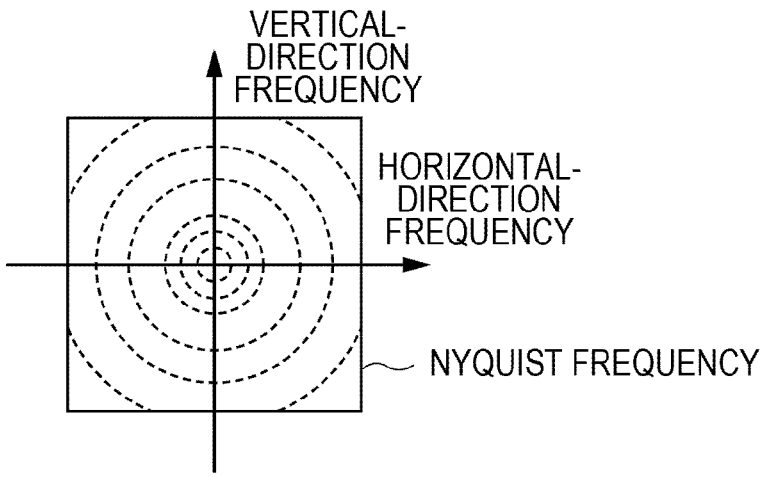
FIGS. 8A to 8C are diagrams illustrating two-dimensional frequency characteristics according to Embodiment 1.
Figure 8B:
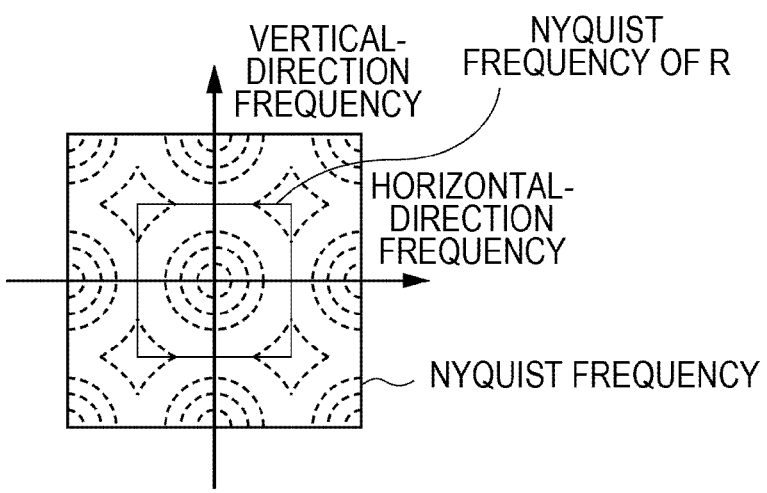

The description has been given under the assumption of one dimension for easy description. However, since the actual filter array is formed in a two-dimensional manner, it is necessary to consider a folding due to the Nyquist frequency in a two-dimensional manner. A two-dimensional process will be described with reference to FIGS. 8A to 8C. The OTF in a case where the color filter array is not taken into consideration is illustrated in FIG. 8A. The vertical axis and the horizontal axis indicate the frequencies in the vertical direction and the horizontal direction, respectively. Also, frequency responses are represented by contour lines. The frequency response is equal on a contour line. Since sampling is performed in the sensor, there is no frequency over the Nyquist frequency in both the vertical direction and horizontal direction. An inverse filter can be formed by obtaining the reciprocal of the OFT for each frequency in FIG. 8A and performing inverse Fourier transform. The frequency response in the case of considering the folding in the R plane is illustrated in FIG. 8B. Then, it is understood that a response characteristic in high frequencies is high due to the folding in FIG. 8B, compared to the case of not considering the filter array in FIG. 8A.

Figure 8C:
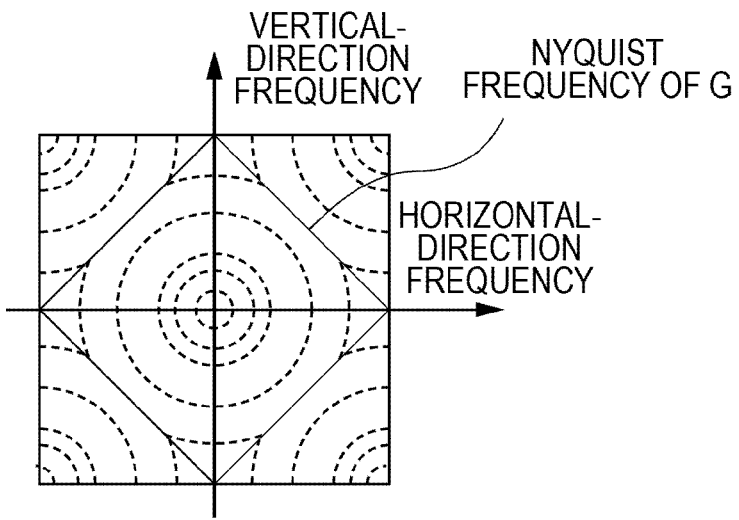

The method for forming an image recovery filter according to this embodiment is characterized by obtaining a recovery filter by obtaining the reciprocal of the frequency characteristic in FIG. 8B and performing Fourier transform. The frequency characteristic of R after sampling with the filter array has been performed is that illustrated in FIG. 8B, and thus a high-frequency component is excessively emphasized if the reciprocal of the OTF in FIG. 8A is multiplied by the frequency characteristic in FIG. 8B without considering the filter array. The high-frequency component that is excessively emphasized by a conventional method causes the occurrence of artifacts such as ringing. In the present invention, the reciprocal of the frequency characteristic after sampling is obtained, and thus excessive emphasis of high frequencies is prevented. A description will be given of the necessity for changing the method for forming an image recovery filter in accordance with a filter array. FIG. 8C illustrates the frequency characteristic of the G plane after sampling has been performed with a Bayer array. When the frequency characteristic of the G plane in FIG. 8C is compared with the frequency characteristic of the R plane in FIG. 8B, it is understood that the folding states are different from each other. That is, folding occurs in the shape of the central square in the frequency plane in the R plane, whereas folding occurs in the shape of a rhombus in the G plane. Thus, in the case of forming a recovery filter by considering folding in the present invention, it is necessary to change the method for forming the recovery filter in accordance with a filter array because the method of folding varies in accordance with the arrangement of the individual filters.

Details of Demosaicing

The details of performing demosaicing on RAW data after blur correction will be described.

First, demosaicing based on a simple linear operation will be described. A Bayer array is used as an example for the description. Pieces of RAW data in individual RGB color planes have pixels that do not have a value. The state of the individual color planes after zero has been inserted into pixels not having a value is illustrated in FIG. 4. In the demosaicing based on a linear operation, a convolution process may be performed on the individual color planes using the filters illustrated in FIGS. 9A and 9B. Specifically, the filter illustrated in FIG. 9A may be used for the R and B planes, and the filter illustrated in FIG. 9B may be used for the G plane.

Figures 10A, 10B:
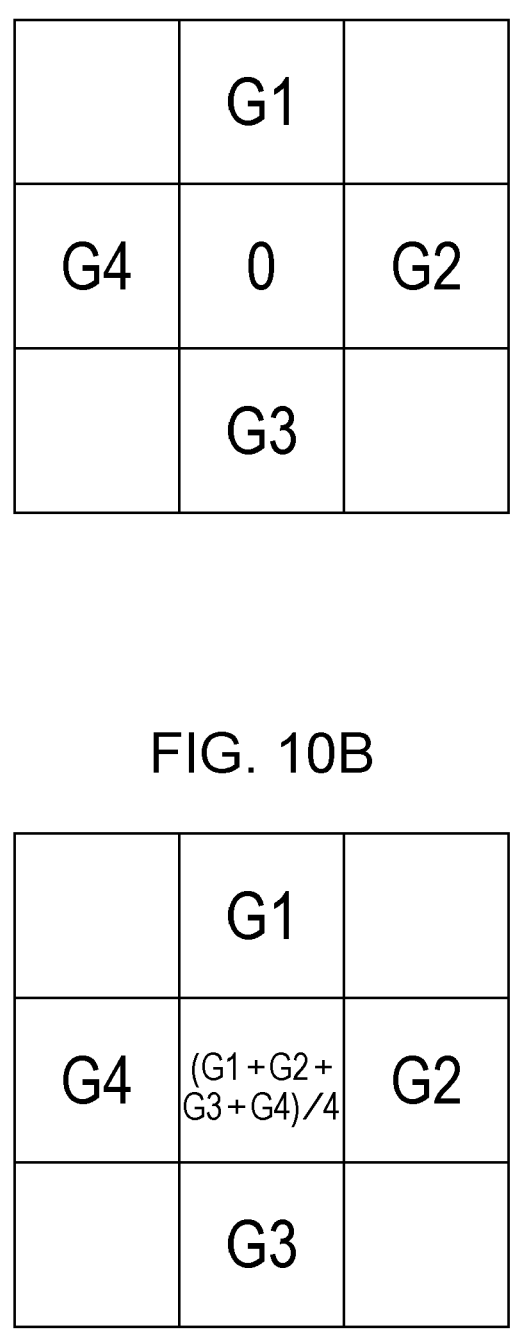

The state where pixels are interpolated through this process is illustrated in FIGS. 10A and 10B. FIG. 10A illustrates an example of the state of the G plane before a demosaic process. The center of FIG. 10A is an unknown pixel and thus zero is inserted thereto. FIG. 10B illustrates a state after convolution. It is understood that the average of adjacent pixels in the vertical and horizontal directions is assigned to the pixel that is unknown in FIG. 10A. Similarly, for the R and B planes, an unknown pixel is interpolated using neighboring pixels after convolution.

Next, a description will be given of an adaptive demosaic process as an example of a demosaic process including a nonlinear process. In the adaptive demosaic process, differences from neighboring pixel values in the vertical, horizontal, or diagonal direction are obtained, and an unknown pixel value is calculated using a pixel in the direction with a small change, instead of simply obtaining the average of the neighboring pixel values as described above. This is because more reliable interpolation can be performed by using a pixel value in the direction with a smaller change. In the present invention, blur correction is performed before demosaicing. However, if blur correction is performed after the adaptive process, the following problem arises. Some of lenses, which are an example of an image pickup optical system, have a characteristic of causing a high degree of blurring in a specific direction and causing a low degree of blurring in a direction vertical to the specific direction. If adaptive demosaicing is performed on an image captured using such a lens, it is likely that interpolation is performed in a direction of a smaller change, that is, in a direction of a high degree of blurring. Operation like an average process is performed in a direction of a high degree of blurring, and thus the degree of blurring increases in the direction in which the degree of blurring is originally high. If blur correction is performed on such an image, a problem of insufficient correction of a blur due to demosaicing arises as well as the above described problem of folding. Furthermore, even if the characteristic of a lens causes blurring in the horizontal direction, if a subject has a clear pattern extending in the horizontal direction, such as vertical stripes, the result of a direction determination may be the vertical direction. Thus, even if only a portion blurred by demosaicing is processed later by sharpening it with another process, it is necessary to change the process for each portion of an image depending on which direction determination has been performed. In the present invention, a blur is corrected before demosaicing, and thus the above-described complicated problem can be avoided.

Next, demosaicing using a correlation among colors will be described as an example of demosaicing including a nonlinear process. As is clear from FIG. 3, the number of G pixels is larger than the number of R pixels and the number of B pixels in the Bayer array. In other words, the G plane has a higher resolution, and fine image information can be obtained compared to the R and B planes. Furthermore, it is known that the G plane has a high correlation with the R and B planes. In advanced demosaicing, interpolation of unknown pixels is performed in the R and B planes by actively using the information about the G plane. For example, in order to interpolate an unknown R value, neighboring G pixel values are used in addition to neighboring R pixel values, thereby determining the unknown R pixel value. For this reason, a blur characteristic of an image in the G plane is mixed into a blur characteristic of an image in the R plane.

Assume a case where an image pickup optical system has a characteristic of causing a higher degree of blurring in the R plane than in the G and B planes. In this case, it is understood that the high degree of blurring of an image in the R plane is decreased to some extent by using the image information of the G plane with a low degree of blurring. That is, the blur characteristic of an image after demosaicing does not necessarily reflect the blur characteristic of the image pickup optical system.

If blur correction is performed using a recovery filter obtained from the PSF of the image pickup optical system without considering this point, undesirable artifacts occur in the corrected image. In the foregoing example, the degree of blurring in the R plane is lower than that expected from the blur characteristic of the image pickup optical system. Thus, if blur correction is performed, excessive correction is performed, which is a factor of causing artifacts such as ringing. In the present invention, blur correction is performed on RAW data before demosaicing, thereby avoiding the foregoing problem.

As described above, blur correction is performed before demosaicing, so that the degree of blurring caused by an image pickup optical system can be corrected to be decreased before the blur characteristic of an image is affected by demosaicing.

Embodiment 2

Figure 6:
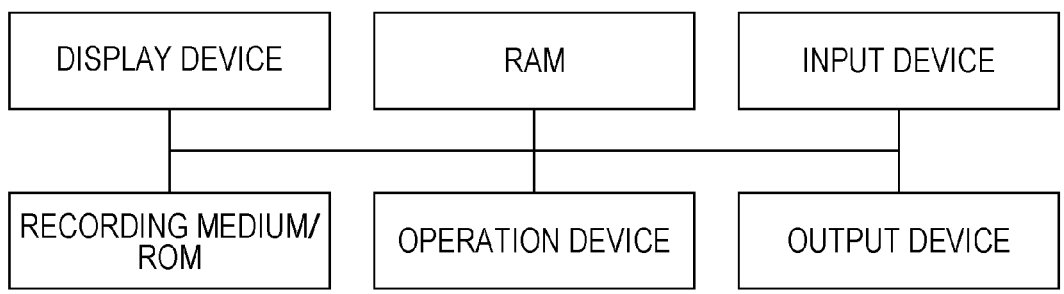
FIG. 6 illustrates an example of an apparatus configuration that realizes functions of Embodiment 1.

An object of the present invention is also achieved by supplying a recording medium storing a software program code that realizes the functions of the above-described embodiment to a system or an apparatus so that the computer (or CPU or MPU) of the system or the apparatus executes the program code. An example of an apparatus configuration is illustrated in FIG. 6. In this case, the program code itself read from a storage medium realizes the functions of the above-described embodiment, and the storage medium storing the program code is included in the present invention.

Specifically, the above-described system or computer obtains RAW data via an input device or network in step S101 illustrated in FIG. 2. Also, the correction coefficient of the optical image pickup system corresponding to S102 is provided to the computer via a recording medium or network. Then, the operation device of the above-described system or computer may perform an image recovery process, a demosaic process, and other processes.

Examples of a computer-readable storage medium for supplying the program code include a flexible disk, a hard disk, an optical disc, a magneto-optical disc, a CD-ROM, a CD-R, magnetic tape, a nonvolatile memory card, a ROM, a DVD, and the like.

The functions of the above-described embodiment are realized by executing the program code read by the computer. Also, the functions of the above-described embodiment may be realized when an operating system (OS) or the like operating in the computer performs part or whole of actual processing on the basis of the instruction of the program code.

Furthermore, the functions of the above-described embodiment may be realized when the code read from the storage medium is executed in a process of a function expansion unit inserted into the computer.

According to the present invention, favorable blur correction can be performed on a blur in a captured image caused by an image pickup optical system.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of International Patent Application No. PCT/JP2010/057083, filed Apr. 21, 2010, which is hereby incorporated by reference herein in its entirety.

What is claimed is:

1. An image processing apparatus comprising:
a memory;
a processor coupled to the memory which executes the following:
inputting RAW data, the RAW data being obtained by sampling light that enters an image pickup apparatus including a color filter comprising a plurality of colors and a sensor, the sampling being performed in the sensor via the color filters;
generating color planes each corresponding to one of the plurality of colors by using an arrangement of the color filter, values at pixel positions which do not correspond to the corresponding color of the color plane being zero;
correcting a blur of each of color planes to obtain a corrected color plane by $$G_c''=m_c \times [R_c * \{m_c \times (h_c * f_c)\}]$$

c: color of color plane
$G_c''$: Corrected color plane for color c
$m_c$: mask function for color c (1 at positions for color c and 0 at positions for colors other than color c)
$R_c$: image recovery filter for color c
$h_c$: PSF corresponds to color c
$f_c$: color plane for color c;
and
performing a demosaic process on the corrected color planes, thereby generating output image data.

2. The image processing apparatus according to claim 1, further comprising obtaining the correction coefficient;

wherein the correcting the blur of the RAW images represented by the RAW data on the basis of the correction coefficients obtained.

3. The image processing apparatus according to claim 2, wherein the correcting corrects the blur of the RAW images using image recovery filters that are generated using the correction coefficients, thereby obtaining the corrected images.

4. The image processing apparatus according to claim 1, wherein a linear or nonlinear demosaic process is performed on the plurality of corrected images.

5. The image processing apparatus according to claim 1, wherein the correction increases a frequency response in a Nyquist frequency of the RAW images represented by the RAW data with respect to the plurality of colors.

6. The image processing apparatus according to claim 2, wherein the correction coefficients are determined on the basis of an optical characteristic of the image pickup apparatus.

7. An image processing method comprising:
inputting RAW data, the RAW data being obtained by sampling light that enters an image pickup apparatus including a color filter comprising a plurality of colors and a sensor, the sampling being performed in the sensor via the color filters;
generating color planes each corresponding to one of the plurality of colors by using an arrangement of the color filter, values at pixel positions which do not correspond to the corresponding color of the color plane being zero;
correcting a blur of each of color planes to obtain a corrected color plane by $$G_c''=m_c \times [R_c * \{m_c \times (h_c * f_c)\}]$$

c: color of color plane
$G_c''$: Corrected color plane for color c
$m_c$: mask function for color c (1 at positions for color c and 0 at positions for colors other than color c)
$R_c$: image recovery filter for color c
$h_c$: PSF corresponds to color c
$f_c$: color plane for color c;
and
performing a demosaic process on the corrected color planes, thereby generating output image data.

8. A non-transitory computer-readable recording medium storing a program causing a computer to function as:
input means for inputting RAW data, the RAW data being obtained by sampling light that enters an image pickup apparatus including a color filter comprising a plurality of colors and a sensor, the sampling being performed in the sensor via the color filters;
generating means for generating color planes each corresponding to one of the plurality of colors by using an arrangement of the color filter, values at pixel positions which do not correspond to the corresponding color of the color plane being zero;
correcting means for correcting a blur of each of color planes to obtain a corrected color plane by $$G_c''=m_c \times [R_c * \{m_c \times (h_c * f_c)\}]$$

c: color of color plane
$G_c''$: Corrected color plane for color c
$m_c$: mask function for color c (1 at positions for color c and 0 at positions for colors other than color c)
$R_c$: image recovery filter for color c
$h_c$: PSF corresponds to color c
$f_c$: color plane for color c;
and
demosaicing means for performing a demosaic process on the corrected color planes corrected by the correcting means, thereby generating output image data.

* * * * *